(12) United States Patent
Bull et al.

(10) Patent No.: US 7,497,241 B2
(45) Date of Patent: Mar. 3, 2009

(54) TIRE BELT MACHINE

(75) Inventors: Jeffrey F. Bull, Tallmadge, OH (US); Evan Smith, Massillon, OH (US)

(73) Assignee: The Steelastic Company, LLC, Akron, OH (US)

( * ) Notice: Subject to any disclaimer, the term of this patent is extended or adjusted under 35 U.S.C. 154(b) by 71 days.

(21) Appl. No.: 11/191,429

(22) Filed: Jul. 27, 2005

(65) Prior Publication Data
US 2007/0023952 A1 Feb. 1, 2007

(51) Int. Cl.
*B29D 30/08* (2006.01)

(52) U.S. Cl. .................... 156/397; 156/406.4; 156/512; 156/907

(58) Field of Classification Search ................. 156/397, 156/406.4, 512, 906, 907
See application file for complete search history.

(56) References Cited

U.S. PATENT DOCUMENTS

| | | | |
|---|---|---|---|
| 3,253,489 A | 5/1966 | Phillips | |
| 3,803,965 A | 4/1974 | Alderfer | |
| 3,844,871 A | 10/1974 | Habert et al. | |
| 3,888,713 A | 6/1975 | Alderfer | |
| 4,087,308 A | 5/1978 | Baugher et al. | |
| 4,466,531 A | 8/1984 | Baugher et al. | |
| 4,552,602 A | 11/1985 | Landsness | |
| 4,719,855 A | 1/1988 | Cannon et al. | |
| 4,744,930 A | 5/1988 | Twist et al. | |
| 4,871,493 A * | 10/1989 | Goto ........................ 264/40.6 |
| 4,874,455 A | 10/1989 | Ginter | |
| 4,877,468 A * | 10/1989 | Siegenthaler ............... 156/111 |
| 4,944,666 A | 7/1990 | Hilke et al. | |
| 5,320,266 A | 6/1994 | Noé et al. | |
| 5,342,473 A | 8/1994 | Bibona et al. | |
| 5,354,404 A | 10/1994 | Benjamin | |
| 5,385,621 A | 1/1995 | Golightly | |

(Continued)

FOREIGN PATENT DOCUMENTS

DE 20 55 456 A1 5/1972

(Continued)

OTHER PUBLICATIONS

International Search Report (Form PCT/ISA/206) listing the five above-identified patents—Date of Mailing: Dec. 8, 2006.

(Continued)

*Primary Examiner*—Robert B Davis
*Assistant Examiner*—Joseph Leyson
(74) *Attorney, Agent, or Firm*—Renner Kenner Greive Bobak Taylor & Weber

(57) ABSTRACT

A tire belt machine comprises an extruder, a cooling drum, and a cutting station, such that the cooling drum draws a strip from the extruder. The cutting station is adapted to cut the strip into a plurality of plies that are laid adjacent one another to form a splice therebetween. A strip width sensor, a strip tracking system, and a strip temperature sensor are coupled to a central control unit to monitor the characteristics of the strip as it is processed. Based upon the monitored characteristics, the central control unit adjusts the operation of one or more of the components of the tire belt machine to maintain uniform splices between the strips.

18 Claims, 5 Drawing Sheets

U.S. PATENT DOCUMENTS

| | | |
|---|---|---|
| 5,567,269 A | 10/1996 | Golightly |
| 5,777,880 A | 7/1998 | Bowen et al. |
| 5,843,349 A | 12/1998 | Anders et al. |
| 5,882,456 A * | 3/1999 | Kohne .................. 156/129 |
| 5,942,059 A | 8/1999 | Wulker et al. |
| 6,004,414 A | 12/1999 | Tabuchi et al. |
| 6,355,126 B1 | 3/2002 | Ogawa |
| 6,797,095 B2 * | 9/2004 | Mancini et al. ............. 156/111 |
| 2001/0002608 A1 * | 6/2001 | Okada et al. ............. 156/128.1 |
| 2002/0043329 A1 | 4/2002 | Suda |
| 2003/0051794 A1 * | 3/2003 | Suda et al. .................. 156/123 |

FOREIGN PATENT DOCUMENTS

| | | |
|---|---|---|
| DE | 39 41 120 A1 | 6/1990 |
| DE | 195 39 494 A1 | 4/1996 |
| EP | 0 619 170 A2 | 10/1994 |
| EP | 0 943 707 A2 | 9/1999 |
| EP | 1 422 047 A2 | 5/2004 |
| WO | WO 02/38362 A1 | 5/2002 |

OTHER PUBLICATIONS

International Search Report (Form PCT/ISA/206) listing the nine above-identified patents—Date of Mailing: Feb. 9, 2007.

* cited by examiner

TIRE BELT MACHINE

RELATED PATENT APPLICATIONS

None.

TECHNICAL FIELD

In general, the present invention relates to a tire belt machine. More particularly, the present invention relates to a tire belt machine having improved control that simultaneously monitors and adapts all aspects of the belt making process.

BACKGROUND OF THE INVENTION

Tire belt formation is a well known practice that involves pulling multiple cords through an extrusion die. The extruder heats elastomeric material and coats the cords traveling through the die. Cooling drums adjacent to the extruder act both to pull the cords through the die and cool the fiber reinforced material before the cutting and splicing phase of production. After traveling through the cooling drums, the fiber reinforced material is allowed to hang with some slack in order to remove some residual forces. The fiber reinforced material is then drawn onto a cutting station. The cutting station includes a strip vacuum transfer, a cutter and a belt conveyor. The strip vacuum transfer advances the fiber reinforced strip and positions it on the belt conveyor so that the cutter may cut the fiber reinforced material. The belt conveyor then indexes a predetermined distance. The strip vacuum transfer again advances the strip onto the conveyor so that the cutter again cuts it. This process results in a continuous belt of fiber reinforced material with the reinforcing cords lying at some angle typically not parallel to the central axis of the belt.

The cut sections of this material overlap one another on the belt conveyor by a predetermined distance. This overlap is generally known in the art as a splice. A uniform splice is needed to maintain proper material strength and quality. The belt conveyor is typically aligned at an angle relative to the fiber reinforced material entering the cutting station, such that after the splicing process, a continuous strip of material lays on the conveyor, comprised of fibers oriented at a predetermined angle.

Because the process involves uncured elastomeric material, handling of the material is difficult. This difficulty stems largely from the variability in width of the fiber reinforced strip. This variability manifests itself largely at the splicing portion of the process. Difficulties in aligning adjacent sheets on the belt conveyor often result in poor splices making the belt unsuitable for its intended use. These inaccuracies are often the result of inconsistent dimensioning of the material as it comes out of the extruder. Presently, to achieve good dimensional accuracy and splices, the belt making system relies heavily on the human operator that monitors the dimensional accuracy of the fiber reinforced material as it comes from the extruder and makes adjustments at various stages of the process, to ensure good splices. For instance, operation of the cutting station requires that an operator cut an initial strip of fiber reinforced material and place it on the belt conveyor, manually index the belt conveyor, cut another strip, and establish a good splice. This index distance is then stored in the cutting station hardware such that once placed in an automatic operation mode, the conveyor will advance that pre-set distance automatically after each cut and splice. Any change in the fiber reinforced material width must be continually monitored by the operator. If material width changes and adjustments are not made to the index distance, a poor splice will result. This problem was overcome in the past through extensive operator supervision. If the operator detected a change in the fiber reinforced strip width, he would place the machine in a manual mode, reestablish a good splice and then place the cutting station back in automatic mode. This required experienced operators to ensure a quality product. Also, the manual adjustments result in a loss in efficiency.

As will be appreciated, given the number of stages involved in the process and the intense focus needed to monitor all of the controls, operators must acquire a great deal of experience before becoming sufficiently proficient in operating the machine, to produce consistent quality results. As a result, during the learning process, the system may not operate at its most efficient rate.

Consequently, to improve efficiency, in terms of consistent quality product, a tire belt making system that relieves some of the burden on the human operator is desirable.

SUMMARY OF THE INVENTION

It is an object of the present invention to provide an improved tire belt making system.

In view of this object, the present invention generally provides a method of controlling a tire belt machine having a cutting station that receives a strip of material cuts it into plural lengths that are spliced together on a belt conveyor, the method including establishing a belt conveyor index distance; receiving signals representing a width of the strip entering a cutting station; and automatically adjusting the belt conveyor index distance based on the strip's width such that uniform splice characteristics are attained.

The present invention further provides a computer-readable media tangibly embodying a program of instructions executable by a computer to perform a method of controlling a tire belt machine, the method including establishing a belt conveyor index distance; receiving signals representing strip width entering a cutting station; and automatically adjusting the belt conveyor index distance based on the belt material width such that uniform splice characteristics are attained.

The present invention further provides a computer-readable media tangibly embodying a program of instructions executable by a computer to perform a method of controlling a tire belt machine, the method including monitoring the length of a strip extending between a cutting station and a cooling drum; automatically slowing the cooling drum if the strip is too long; and automatically speeding up the cooling drum if the strip is too short relative to a pre-selected strip length.

The present invention further provides a computer-readable media tangibly embodying a program of instructions executable by a computer to perform a method of controlling a tire belt machine, the method including receiving signals representing the speed of cords traveling through an extruder; and sending signals to the extruder adjusting an extruder pressure set-point as a function of the cord speed, wherein the extruder pressure set-point increases as the cord speed increases and the extruder pressure set-point decreases as the cord speed decreases.

The present invention further provides a computer-readable media tangibly embodying a program of instructions executable by a computer to perform a method of controlling a tire belt machine, the method including sending an activation command from a central control unit to an extruder pressure controller; receiving the activation command by the extruder pressure controller, wherein the activation command directs the extruder pressure controller to start the extruder at a selected extruder screw speed; and monitoring the extruder pressure and when extruder pressure is within a selected pressure range for the selected extruder screw speed setting, the central control unit directs the extruder pressure controller to enter an automatic operation mode, wherein the extruder pressure controller maintains pressure control over the extruder.

The present invention further provides a tire belt machine including an extruder adapted to form a strip having a width; a cooling drum located downstream of the extruder adapted to carry the strip while it cools; a cutting station including a belt conveyor, cutter and strip vacuum transport is located downstream of the cooling drums, wherein the strip is drawn into the cutting station by the strip conveyor; the cutting station being adapted to cut the strip into plies that are laid on the belt conveyor, where the belt conveyor is adapted to advance an index distance after operation of the cutter such that successive plies are lain substantially adjacent to each other on the belt conveyor forming a splice between the successive plies; a central control unit in communication with the extruder, the cutting station, and the conveyor assembly; a strip width sensor located upstream of the cutting station, the strip width sensor being adapted to monitor the width of the strip and communicate with the central control unit, wherein the central control unit adjusts operation of at least one of the extruder or the cutting station and conveyor to maintain a selected strip width; a strip tracking system adapted to monitor the amount of the strip available for the cutting station and communicate with the central control unit, wherein the central control unit adjusts operation of at least one of the extruder or cooling drum to enable cutting station to operate at maximum speed; a strip temperature sensor to monitor the temperature of the strip downstream of the extruder and communicate with the central control unit, wherein the central control unit adjusts operation of at least one of the extruder or the cooling drum to maintain the strip temperature below a predetermined value.

BRIEF DESCRIPTION OF THE DRAWINGS

For a complete understanding of the objects, techniques and structure of the invention, reference should be made to the following detailed description and accompanying drawings wherein.

DETAILED DESCRIPTION OF THE INVENTION

Figure 1:
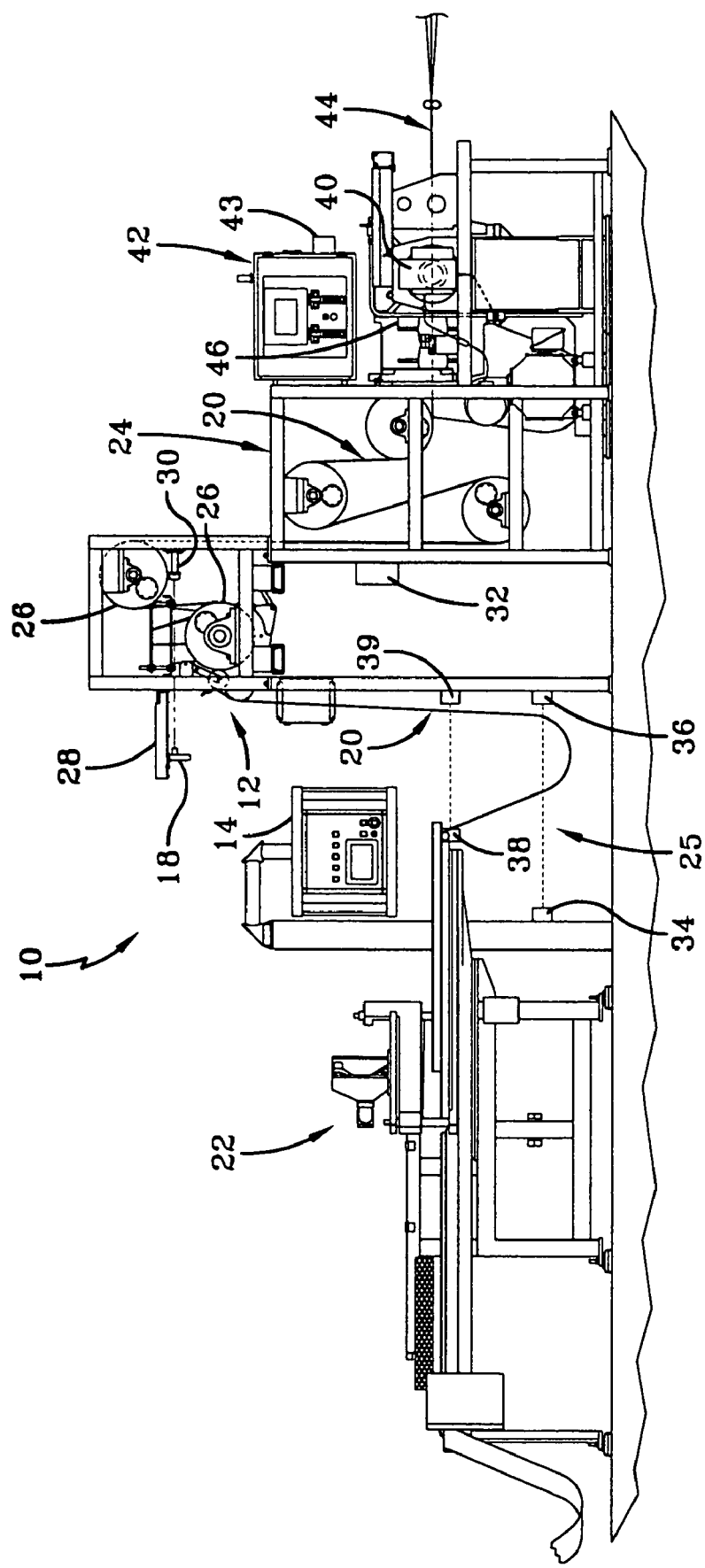
FIG. 1 is a partially schematic, operational view of a tire belt making system according to the concepts of the present invention.
Figure 2:
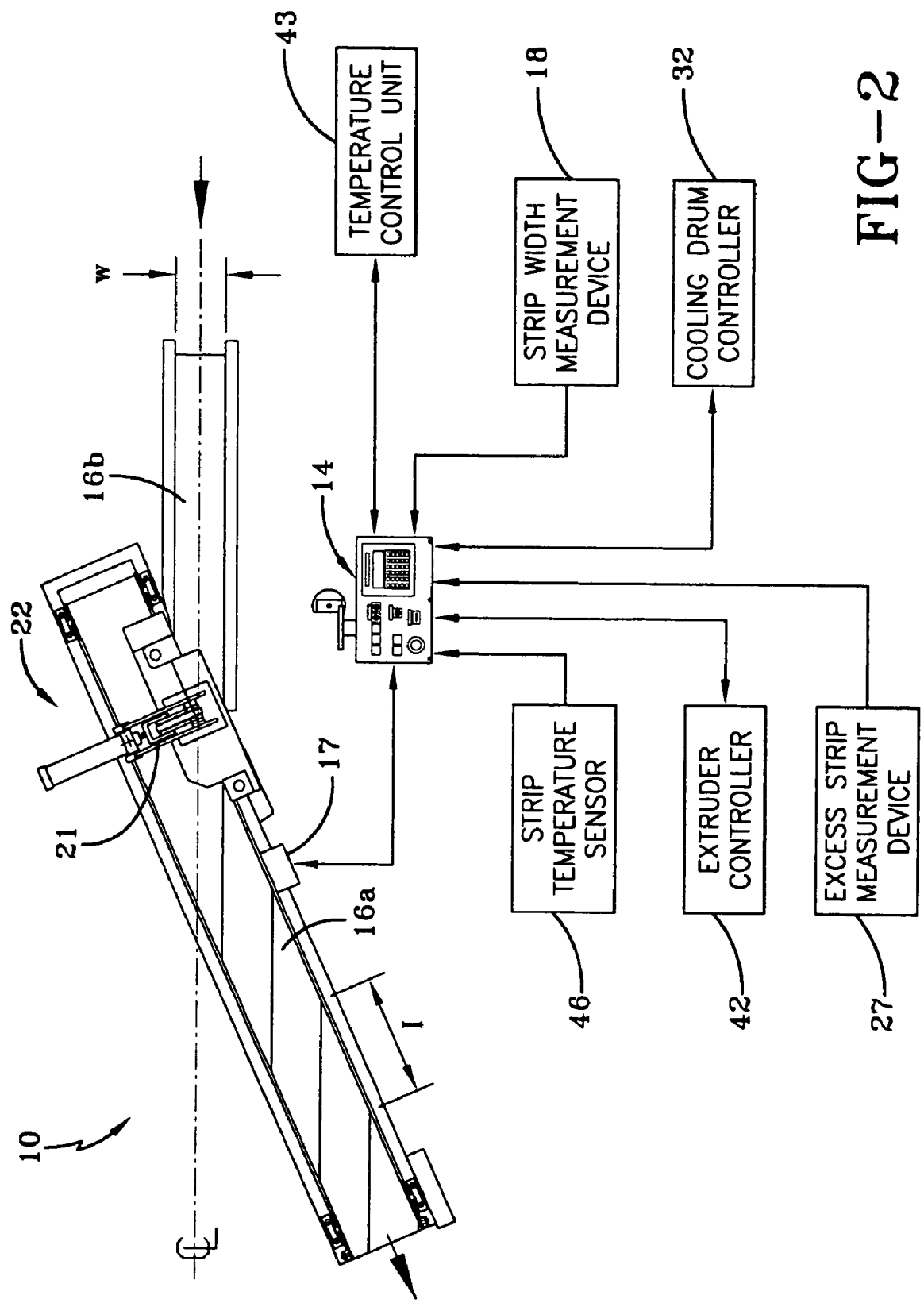
FIG. 2 is a partially schematic, operational top plan view of a tire belt making system according to the concepts of the present invention.

A tire belt making system according to the concepts of the present invention is generally indicated by the numeral 10 in the drawings. The belt making system employs a central control unit 14 that electronically controls various systems. These systems could include a strip width measurement and adjustment system, a strip tracking system, electronic extruder control, and a strip temperature sensing system. Each of these elements is in communication with central control unit 14. Central control unit 14 gathers information from the various systems and modifies system parameters when necessary to help minimize operator supervision and adjustment while ensuring maximum production speed.

According to one aspect of the present invention, system 10 includes a strip width monitoring system, generally indicated by the numeral 12. This system monitors the width W of the fiber reinforced strip and makes appropriate parameter adjustments to ensure a quality final product. A strip width measurement device, generally indicated by the numeral 18, measures strip width W after it exits the cooling drums 24 and communicates that data, either through wireless signals or fixed cables, to the central control unit 14. The central control unit 14 evaluates the data and determines if the strip width W is within a predetermined range. This range may be operator adjustable. If the strip width W falls outside that range, the central control unit 14 communicates with the cutting station 22, modifying the index distance I that the belt conveyor 16a advances after each splice. The conveyor may have a local controller which the central control unit 14 communicates with or the central control unit 14 may communicate directly with the belt conveyor motor 17. In this way system 10 maintains desired splice characteristics regardless of changes in fiber reinforced strip width W.

The width measurement device 18 of the present invention may employ one or more sensors mounted in any fashion that places the sensor in sensing relation to the fiber reinforced strip 20. The sensor may be located in a position that allows the sensor to measure the strip 20 as it exits the cooling drums 24. Referring now to FIG. 1, an example of a width measurement device 18 is a width monitoring camera which measures the fiber reinforced strip 20 before it enters the cutting station 22. Measurement of the fiber reinforced strip width W is feasible at any point before the strip 20 enters cutting station 22. As will be appreciated, more reliable measurement may be taken after the strip 20 has cooled. For example, the strip 20 is typically cool, and consequently stable, after traveling through the cooling drums 24. In the depicted example, once the strip leaves the last cooling drum it is drawn through a pair of tension rollers 26. The tension rollers 26, are vertically offset a predetermined distance to allow a width monitoring camera 18 to view the strip 20 as it travels therebetween. The tension rollers may be horizontally offset such that a vertical tangent drawn from the left side of the top roller is co-planar with a vertical tangent drawn from the right side of the bottom tension roller. In other words, in one embodiment, the fiber reinforced strip 20, as it is drawn from the top to the bottom tension roller is substantially perpendicular to the ground. In this manner, the tension rollers 26 maintain a constant force on the fiber reinforced strip 20 so that accurate and repeatable measurements are possible. The width measurement device 18 is positioned such that it continuously measures a portion of the strip width W as the strip 20 travels between the tension rollers 26. The width measurement device 18 is attached to a mounting bracket 28 vertically positioned between the two tension rollers 26. The width measurement device 18 may be aligned normal to the face of the fiber reinforced strip 20 and at a distance suitable for viewing the strip width W. A light source or reflection 30 may be positioned on the opposing side of the strip 20 such that a well defined profile is provided. The strip width measurement system 12 might be incorporated into the cutting station 22 or in a stand alone unit.

The width measuring device 18 relays the width data to the central control unit 14. The central control unit 14 may be any electronic device such as a computer or a programmable logic controller, which is capable of receiving and executing computer-readable media tangibly embodying a program of instructions. The central control unit 14 monitors data transmitted from the width measuring device 18 for changes. If the central control unit 14 recognizes strip width changes, it determines a new conveyor index distance I needed to maintain good splices. The central control unit 14 then relays a command to the cutting station 22, commanding the conveyor 16a to index this new distance for subsequent splices. The central control unit may directly control each element of the cutting station 22 or it may communicate with a local cutting station controller 17 which directly controls the belt conveyor 16a, a strip vacuum transport 16b and a cutter 21. In either case, by controlling the index distance, a uniform splice size is ensured, even as the fiber reinforced strip width varies. As an example, if the fiber reinforced strip width grows ten thousandths (0.010") the central control unit 14 correspondingly increases the conveyor index distance by ten thousandths (0.010"), to maintain a good splice. This continuous adjustment by the central control unit 14 eliminates the need for extensive operator supervision and increases operating efficiency.

Figure 3:
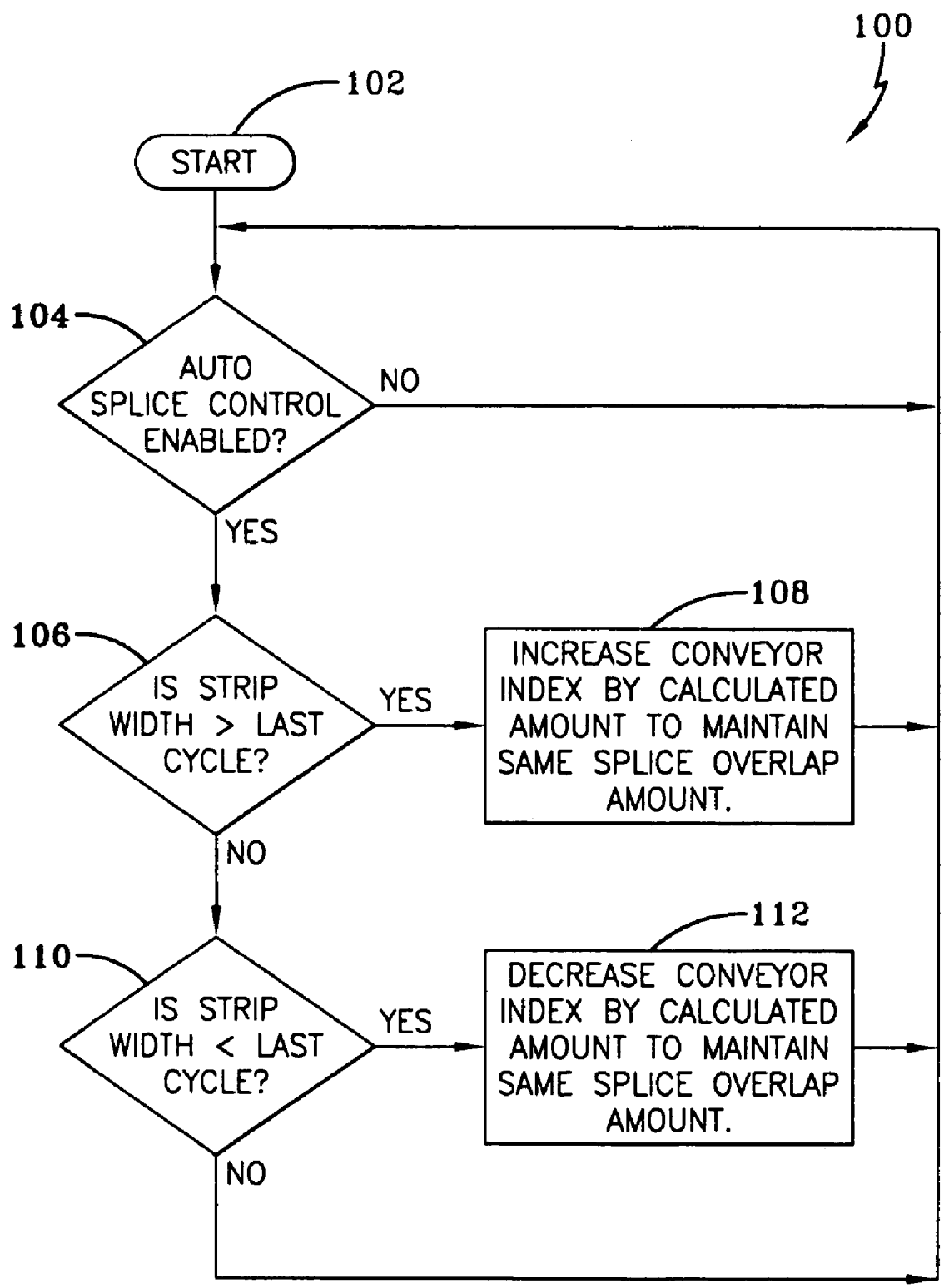
FIG. 3 is an operational flow chart depicting operation of a central control unit of the present invention when strip width monitoring system is enabled.

Referring now to FIG. 3, a flow chart, designated generally by the numeral 100, is representative of one embodiment of computer readable media tangibly embodying a program of instructions that could be contained in the central control unit 14 for controlling the strip width W. The method steps of the software may be programmed to any computer or machine-readable media, and performed by a suitable computer such as the control unit 14.

The process begins when the central control unit 14 is initialized 102. The central control unit 14 may then inquire whether splice width control has been enabled 104. If width control is not enabled, the central control unit 14 takes no further action with regard to width adjustment and monitoring. However, if splice monitoring is enabled, the central control unit 14 then begins to monitor strip width. The central control unit 14 first reviews data from the strip width measuring device 18 and determines whether the strip width W is greater than the previous cycle 106. If the strip width W is larger than the previous cycle, the conveyor index I is increased by a calculated amount that maintains the same splice overlap amount 108. If the strip width W is not greater than the previous cycle, the central control unit 14 then determines whether the strip width W is less than the previous cycle 110. If the strip width W is less than the previous cycle, the conveyor index I distance is decreased by a calculated amount that maintains the same splice overlap amount 112. If the central control unit 14 determines the strip width W is not less than the previous cycle, no correction is made in the index distance I and the cycle is repeated. Depending upon system precision, the software in the central control unit 14 may include a range within which the strip width W may vary without making adjustments to the index distance I.

The present invention may further improve operational efficiency through the use of a strip tracking system 25. Tire belt machines allow fiber reinforced material 20, after exiting the cooling phase of production, to hang slack before entering the cutting station 22. This allows relief of stresses within the material before it is cut. While some slack is desirable, excessive slack might indicate that the system 10 is not operating at the optimal rate. The strip tracking system 25 may track the amount of slack material waiting to enter the cutting station 22 to avoid excess slack. To that end, the strip tracking system 25 may communicate information relating to the amount of slack present to the central control unit 14. Based on this information, the central control unit 14 monitors excess strip length and, if needed, communicates with the cooling drums 24, to adjust the cooling drum speed. The cooling drums 24 may have a local cooling drum controller 32 with which the central control unit 14 communicates, or the central control unit 14 may communicate directly with the cooling drum motor or motors. If too much material is waiting for the cutting station 22, to avoid material piling up on the floor, the system slows the production of the fiber reinforced strip 20, for example by slowing the cooling drums 24. If too little material is available, the cooling drum speed may be increased to match the cooling drum speed with cutting station speed. Conversely, insufficient slack might indicate that the cooling drum speed is lagging behind the cutting station 22, requiring adjustment.

To that end, the strip tracking system 25 may include multiple sensors or limit switches that indicate an excess or inadequate material condition to the central control unit 14. The sensors may be upstream of the cutting station 22 and mounted in any fashion that provides suitable sensing of the fiber reinforced strip 20. For example, as depicted in FIG. 1, two sensors are located underneath the cutting station 22 and pointed towards the cooling drums 24. The sensors are offset vertically by a predetermined distance. The bottom optical sensor 34 is mounted at a predetermined height from the floor. If triggered, it alerts the central control unit 14 that an excess amount of material is accumulating in the area between the cutting station 22 and the cooling drums 24. Triggering of the bottom optical sensor 34 may occur when fiber reinforced material 20 ejected from the cooling drums 24 breaks the optical link between the bottom optical sensor 34 and a corresponding bottom light source 36. Bottom light source 36 is located in the line of sight of optical sensor 34. The bottom light source 36 is positioned such that if the slack portion of the fiber reinforced strip 20 hangs at or below the vertical position of the bottom light source 36 and bottom optical sensor 34, the visual link between the two is broken. For example, the bottom optical light source 36 might be mounted to the frame of the cooling drum station. When the central control unit 14 receives the signal that the visual link is broken, it could command the cooling drums 24 to slow, preventing excess material from accumulating upstream of the cutting station 22, thus reducing the risk of material pile-up on the floor. An upper optical sensor 38 may be positioned above the bottom optical sensor 34 by a predetermined distance and has a corresponding upper light source 39. The upper optical sensor 38 and light source 39 are positioned at the same height and could be mounted to the cutting station and cooling drum frames respectively. If the reinforced strip 20 is not in the sensor's line of sight, this indicates to the central control unit 14 that the cooling drums 24 are not operating fast enough to keep the cutting station 22 supplied with material. The central control unit 14 could then command the cooling drums 24 to speed up, thereby increasing the speed of production. It should be appreciated that the sensors described above are provided as an example. Other systems available in the art may also be used to monitor the amount of material ready for cutting. One alternative might include a system that tracks cooling drum speed relative to conveyor speed. This system could be incorporated within the central control unit 14.

Figure 4:
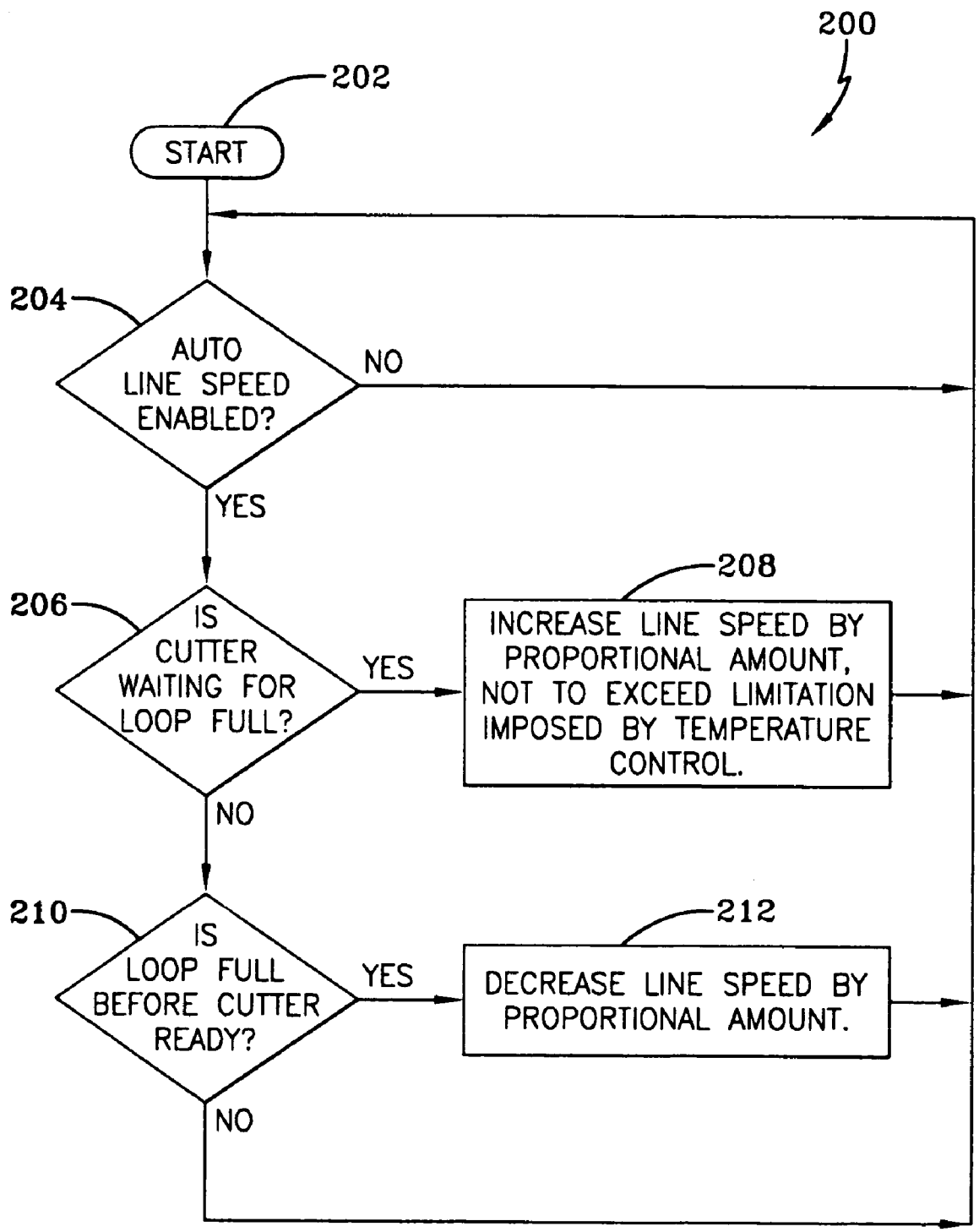
FIG. 4 is an operational flow chart depicting operation of the central control unit of the present invention when the strip tracking system is enabled.

Referring now to FIG. 4, a flow chart, designated generally by the numeral 200, is representative of one embodiment of computer readable media tangibly embodying a program of instructions that could be contained in the central control unit 14 for controlling speed optimization. This process begins when the central control unit 14 is initialized 202. The central control unit 14 then inquires whether line speed optimization is enabled 204. If line speed optimization is not enabled, the central control unit 14 takes no further action. If line speed optimization is enabled, the central control unit 14 receives data from the strip tracking system 25 and determines whether the cutting station 22 is waiting for material 206. If the cutting station 22 is waiting on material the central control unit 14 increases cooling drum speed by a proportional amount so long as it does not exceed limitations imposed by temperature controls 208. If the central control unit 14 determines that the cutting station is not waiting for material, the central control unit 14 then determines whether the loop is full before the cutting station 22 is ready 210. If the central control unit 14 determines that material is available faster than the cutting station 22 can handle, the cooling drum speed is decreased by a proportional amount 212. If the central control unit 14 determines that excess material is not waiting at the cutting station 22, no line speed adjustment occurs and the cycle repeats.

According to another aspect of this invention the extruder 40 may be remotely controlled by central control unit 14. The extruder 40 may include a local extruder controller 42 as shown in FIG. 1, with which the central control unit 14 communicates, or the central control unit 14 may communicate directly with the extruder motors and sensors. The central control unit 14 sends commands to the extruder controller 42, and the extruder controller 42 communicates extruder die pressure data to the central control unit 14. Central control unit 14 commands to the extruder controller 42 could include manual and automatic screw speed settings as well as pressure set-points. This integration may be used to facilitate an automatic startup procedure.

The automatic start-up procedure could begin by depressing a start-button on the central control unit 14. The central control unit 14 then commands the local extruder controller 42 to initiate the extruder 40. The central control unit 14 then communicates an extruder screw RPM set-point to the extruder controller 42. The central control unit 14 then monitors die pressure and when the die pressure reaches a predetermined range, for example, within 200 to 500 PSI of a first desired pressure, the central control unit 14 communicates with the cooling drum controller 32, starting the cooling drums 24 at a predetermined start-up speed. The start of the cooling drums draws cords 44 through the extruder die 40. The central control unit 14 continues to monitor actual die pressure and varies the screw velocity as required, to bring the die pressure to within, for example, 200 psi of a second desired pressure. Once this pressure is reached, the central control unit 14 communicates with the local extruder controller 42, placing it in an automatic operation mode. The local extruder controller 42 then takes over normal pressure control of the die, using either a local input pressure value or a set-point communicated by the central control unit 14. By automating the startup process, the system reduces out of spec material normally produced during manual start up, reduces damage to die heads, and reduces operator involvement in start-up activities thus allowing him or her to concentrate on other tasks.

Figure 5:
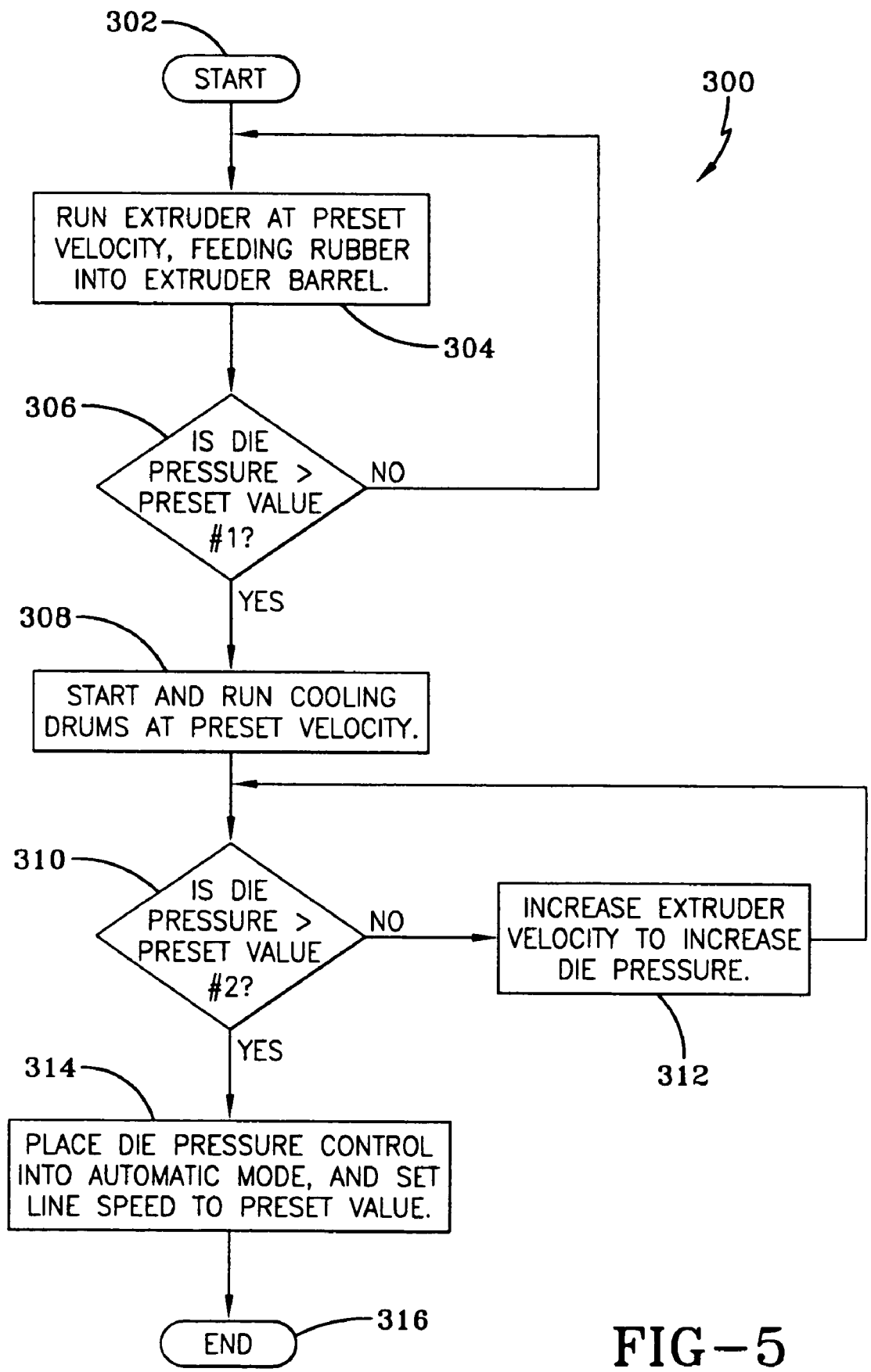
FIG. 5 is an operational flow chart depicting an automatic start-up procedure.

Referring now to FIG. 5, a flow chart, designated generally by the numeral 300, is representative of one embodiment of computer readable media tangibly embodying a program of instructions that could be contained in the central control unit 14 for controlling of a single button startup sequence. The process begins when the central control unit 14 is initialized 202. The central control unit 14 then sends a command to the local extruder controller 42 to initialize the extruder 40, commanding it to run at a predetermined speed 304. At this point, rubber is fed into the extruder barrel. The central control unit 14 then monitors the die pressure 306 and when it achieves a value greater than a first preset value, the central control unit 14 starts the cooling drums at a preset velocity 308. The central control unit 14 continues to monitor the die pressure. If, at each cycle, the die pressure is below a second preset value the central control unit 14 commands the local extruder control 42 to increase extruder 40 velocity. When the die pressure is greater than the second predetermined value the central control unit 14 places the die pressure control into an automatic mode and sets the cooling drum speed to a preset value, ending the startup sequence.

The integration of the extruder controller 42 with the central control unit 14 allows the central control unit 14 to vary extruder die pressure in proportion to cooling drum speed. For example, if cooling drum speed increases because the cutting station is waiting on material, to reduce the likelihood of strip width variation, the central control unit 14 can communicate with the extruder controller 42, increasing extruder die pressure as appropriate. If line speed decreases, the central control unit 14 could communicate with the extruder controller 42 decreasing extruder die pressure.

Still another aspect of this invention is electronic remote control of the extruder temperature control unit 43. This unit monitors and controls extruder temperature settings. These temperatures require control and monitoring to ensure the elastomeric material properly mixes and does not reach unacceptable or curing temperature. The temperature control unit 43 may continuously send data to the central control unit 14 concerning internal temperatures of internal -extruder components such as the barrel and screw. The central control unit 14 may command the temperature control unit 43 to vary these temperatures according to the material specifications or to increase efficiency.

A further aspect of this invention is the incorporation of a strip temperature sensing system. This system employs a temperature sensor 46, and the central control unit 14. The strip temperature sensor 46 measures fiber reinforced strip temperature as it exits the die 40. The strip temperature sensor 46 then communicates temperature data to the central control unit 14. The central control unit 14 monitors this data, and if strip temperature falls outside a predetermined range, the central control unit 14 may communicate with the extruder 40, extruder temperature control unit 43, cooling drums 24, or a combination of these to effect appropriate strip temperature change. As shown for example in FIG. 1, strip temperature sensor 46 could be an infra-red sensor mounted to the extruder frame just outside the die head. This sensor 46 measures fiber reinforced strip temperature and communicates this data to the central control unit 14. The central control unit 14 thus monitors the temperature of the fiber reinforced strip 20 as it exits extruder 40. It is desirous to maintain a specific temperature range of fiber reinforced material 20 exiting the extruder 40. For example, if the central control unit 14 receives temperature readings outside a predetermined range, it could communicate with the cooling drum controller 32 and reduce cooling drum speed. Slowing production speed leads to lower temperatures in the extruder 40 and consequently reduces the risk of scrap material.

As is evident from the aforementioned disclosures, the central control unit 14 monitors and controls all processes of the tire belt machine 10. The central control unit 14 receives cooling drum speed data from the cooling drums controller 32, fiber reinforced strip width data from the strip width measurement device 18, conveyor index distances I from the cutting station 22, excess strip length data from the strip tracking system 25, extruder data from the local extruder controller 42, extruder temperature data from the extruder temperature control unit 43, and strip temperature data from the strip temperature sensor 46. Further, the central control unit 14 can send commands to the cutting station 22, cooling drums controller 32, extruder controller 42 and extruder temperature control unit 43.

A central control unit 14 may store recipes, based on the settings for each of the tire belt machine components. Recipes are groups of stored system parameters, for example, drum speed, temperature and index distance. If, for example, an operator is achieving exceptional material quality with a particular set of parameters, the operator can save these parameters in the central control unit 14. These recipes are then available at any point in the future in order to obtain similar results. In operation, an operator calls up a recipe on the central control unit 14, initiates that recipe and the central control unit 14 sends commands to each component of the tire belt machine corresponding to the parameters of that recipe. This allows consistent operation over long periods of time as well as reduced start up times. Further, it should be recognized that all of the above described components need not be included to obtain increased efficiency and ease of use. For example, the system might include one or several of the above mentioned systems, depending upon the particular customer's application.

In light of the foregoing, it should thus be evident that a tire belt machine according to the concepts of the present invention substantially improves the art. While, in accordance with the patent statutes, only the preferred embodiment of the present invention has been described in detail hereinabove, the present invention is not to be limited thereto or thereby. It will be appreciated that various modifications may be made to the above-described embodiment without departing from the spirit of the invention. Therefore, to appreciate the scope of the invention, reference should be made to the following claims.

What is claimed is:

1. A tire belt machine comprising:
   an extruder adapted to form a strip of uncured elastomeric material having a plurality of cords, said strip having a variable width;
   a cooling drum located downstream of said extruder adapted to carry said strip while it cools;
   a cutting station including a belt conveyor, a cutter and a strip vacuum transport which are located downstream of said cooling drums, wherein said strip is drawn into said cutting station and positioned on said belt conveyor by said strip vacuum transport;
   said cutting station being adapted to cut said strip into plies after said strip is positioned on said belt conveyor, wherein said belt conveyor is adapted to advance an index distance after operation of said cutter such that successive plies are lain substantially adjacent to each other on said belt conveyor;
   a central control unit in communication with said extruder, said cutting station, and said conveyor assembly;
   a strip width sensor located upstream of said cutting station, said strip width sensor being adapted to monitor the change in the variable width of said strip prior to being cut into plies and communicates with said central control unit, wherein said central control unit adjusts said index distance of said belt conveyor based on the change in variable strip width, so as to move a previously laid ply to a position that allows a subsequently cut ply to be laid substantially adjacent thereto, so as to form a splice therebetween with uniform characteristics;
   a strip tracking system adapted to monitor the amount of said strip available for said cutting station and communicates with said central control unit, wherein said central control unit adjusts operation of at least one of said extruder or cooling drum to enable said cutting station to operate at maximum speed; and
   a strip temperature sensor to monitor the temperature of said strip downstream of said extruder and communicates with said central control unit.

2. The tire belt machine of claim 1, wherein said strip width sensor is located downstream of said cooling drum.

3. The tire belt machine of claim 2, wherein said strip width monitoring sensor is a camera.

4. The tire belt machine of claim 3, wherein a light source is mounted opposite said camera on the opposite side of said strip.

5. The tire belt machine of claim 1, wherein when the amount of said strip available for said cutting station exceeds a predetermined amount, said central control unit communicates with said cooling drums, slowing their operation a proportional amount.

6. The tire belt machine of claim 1, wherein when the amount of said strip available for said cutting station is less than a predetermined amount, said central control unit communicates with said cooling drums accelerating their operation a proportional amount.

7. The tire belt machine of claim 1, wherein said strip tracking system comprises a plurality of optical sensors.

8. The tire belt machine of claim 7, wherein said optical sensors are vertically offset.

9. The tire belt machine of claim 1, wherein when the temperature of said strip becomes greater than a predetermined amount, said central control unit communicates with said cooling drums, to slow the rotation thereof.

10. The tire belt machine of claim 1, wherein said strip temperature sensor comprises an infra-red sensor.

11. The tire belt machine of claim 1, further comprising a computer-readable media tangibly embodying a program of instructions executable by a computer to perform a method of controlling a tire belt machine, the method comprising:
    establishing a belt conveyor index distance;
    receiving signals representing strip width entering a cutting station; and
    automatically adjusting said belt conveyor index distance based on the belt material width such that uniform splice characteristics are attained.

12. The tire belt machine of claim 11, wherein said computer readable media embodying said program of instructions further comprises the step of monitoring the length of strip extending between a cutting station and a cooling drum, automatically slowing said cooling drum if said strip is too long, and automatically speeding up said cooling drum if said strip is too short.

13. The tire belt machine of claim 11, wherein said computer readable media embodying said program of instructions further comprises receiving signals representing the speed of cords traveling through an extruder and sending signals to said extruder adjusting an extruder pressure set-point as a function of the cord speed, wherein said extruder pressure set-point increases as the cord speed increases and said extruder pressure set-point decreases as said cord speed decreases.

14. The tire belt machine of claim 11, wherein said computer readable media embodying said program of instructions further comprises sending an activation command from a central control unit to an extruder controller; receiving said activation command by said extruder controller, wherein said activation command directs said extruder controller to start said extruder at a selected extruder screw speed, monitoring the extruder pressure and when extruder pressure is within a selected pressure range for said selected extruder screw speed setting, said central control unit directs said extruder pressure controller to enter an automatic operation mode, wherein the extruder pressure controller maintains pressure control over said extruder.

15. The tire belt machine of claim 1 further comprising a computer-readable media tangibly embodying a program of instructions executable by a computer to perform a method of controlling a tire belt machine, the method comprising:
   monitoring the length of a strip extending between a cutting station and a cooling drum;
   automatically slowing said cooling drum if said strip is too long; and
   automatically speeding up said cooling drum if said strip is too short relative to a pre-selected strip length.

16. The tire belt machine of claim 1 further comprising a computer-readable media tangibly embodying a program of instructions executable by a computer to perform a method of controlling a tire belt machine, the method comprising:
   receiving signals representing the speed of cords traveling through an extruder; and
   sending signals to said extruder adjusting an extruder pressure set-point as a function of the cord speed, wherein said extruder pressure set-point increases as the cord speed increases and said extruder pressure set-point decreases as said cord speed decreases.

17. The tire belt machine of claim 1 further comprising a computer-readable media tangibly embodying a program of instructions executable by a computer to perform a method of controlling a tire belt machine, the method comprising:
   sending an activation command from a central control unit to an extruder pressure controller;
   receiving said activation command by said extruder pressure controller, wherein said activation command directs said extruder pressure controller to start said extruder at a selected extruder screw speed; and
   monitoring the extruder pressure and when extruder pressure is within a selected pressure range for said selected extruder screw speed setting, said central control unit directs said extruder pressure controller to enter an automatic operation mode, wherein the extruder pressure controller maintains pressure control over said extruder.

18. The tire belt machine of claim 1, wherein said central control unit compares a variable strip width measurement to a predetermined range and wherein if said variable strip width measurement varies within said predetermined range said control unit will not make adjustments to said index distance.

* * * * *